(12) United States Patent
Watson et al.

(10) Patent No.: US 10,890,693 B2
(45) Date of Patent: Jan. 12, 2021

(54) TUNABLE ACOUSTIC GRADIENT LENS WITH AXIAL COMPLIANCE PORTION

(71) Applicant: Mitutoyo Corporation, Kanagawa-ken (JP)

(72) Inventors: William Todd Watson, Kirkland, WA (US); Isaiah Freerksen, Bothell, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 230 days.

(21) Appl. No.: 16/227,561

(22) Filed: Dec. 20, 2018

(65) Prior Publication Data
US 2020/0200950 A1   Jun. 25, 2020

(51) Int. Cl.
*G02B 3/00* (2006.01)
*G02B 7/02* (2006.01)
*G02B 3/12* (2006.01)
*G02B 26/00* (2006.01)
*G02B 3/14* (2006.01)

(52) U.S. Cl.
CPC ............. *G02B 3/0087* (2013.01); *G02B 3/12* (2013.01); *G02B 7/02* (2013.01); *G02B 3/14* (2013.01); *G02B 7/028* (2013.01); *G02B 26/004* (2013.01)

(58) Field of Classification Search
CPC ...... G02B 3/14; G02B 26/004; G02B 3/0087; G02B 3/12; G02B 7/028
USPC .......................................... 359/652–654, 665
See application file for complete search history.

(56) References Cited

U.S. PATENT DOCUMENTS

| | | | |
|---|---|---|---|
| 7,627,162 B2 | 12/2009 | Blanford et al. | |
| 7,701,643 B2* | 4/2010 | Batchko | H01L 41/092 359/665 |
| 8,194,307 B2* | 6/2012 | Arnold | G02B 27/0927 359/655 |
| 9,108,268 B2* | 8/2015 | Nomaru | B23K 26/0006 |
| 9,143,674 B2 | 9/2015 | Gladnick | |
| 9,213,175 B2 | 12/2015 | Arnold | |

(Continued)

OTHER PUBLICATIONS

Freerksen et al., "External Reservoir Configuration for Tunable Acoustic Gradient Lens," U.S. Appl. No. 16/000,319, filed Jun. 5, 2018, 43 pages.

(Continued)

*Primary Examiner* — Evelyn A Lester
(74) *Attorney, Agent, or Firm* — Seed IP Law Group LLP

(57) ABSTRACT

A tunable acoustic gradient (TAG) lens includes an acoustic wave generating element and a refractive fluid in a casing cavity surrounded by a lens casing. The lens casing includes case ends which each include a window configuration, a case end rim portion and an enhanced axial compliance portion. The window configuration includes a window and a window mounting portion having an overall window mount dimension along the axial direction. The enhanced axial compliance portion is coupled between the window mounting portion and the case end rim portion and includes a reduced thickness region characterized by a material thickness that is at most 75% of the associated window mount dimension. The axial compliance portion is configured to enhance the axial deflection of the window mounting portion compared to the case end rim portion, when a periodic drive signal is applied to the acoustic wave generating element.

18 Claims, 6 Drawing Sheets

(56) References Cited

U.S. PATENT DOCUMENTS

| | | |
|---|---|---|
| 9,256,009 B2 | 2/2016 | Theriault et al. |
| 9,726,876 B2 | 8/2017 | Bryll |
| 9,736,355 B1 | 8/2017 | Bryll |
| 9,774,765 B2 | 9/2017 | Bryll et al. |
| 9,830,694 B2 | 11/2017 | Bryll |
| 9,930,243 B2 | 3/2018 | Gladnick et al. |
| 9,983,459 B2 | 5/2018 | Arnold |
| 10,101,572 B2 | 10/2018 | Bryll et al. |
| 10,151,962 B2 | 12/2018 | Gladnick et al. |
| 2006/0211802 A1 | 9/2006 | Asgari |
| 2010/0137990 A1 | 6/2010 | Apatsidis et al. |
| 2016/0025903 A1 | 1/2016 | Arnold |
| 2017/0052425 A1 | 2/2017 | Arnold |
| 2017/0078549 A1 | 3/2017 | Emtman et al. |
| 2018/0180773 A1* | 6/2018 | Usami ..................... G03B 5/00 |
| 2019/0369300 A1* | 12/2019 | Freerksen .......... G01N 21/8806 |

OTHER PUBLICATIONS

Mermillod-Blondin et al., "High-speed varifocal imaging with a tunable acoustic gradient index of refraction lens," *Optics Letters* 33(18):2146-2148, 2008.

Williams et al., *Circuit Designs 3, Collected Circards*, IPC Business Press, Ltd., London, UK, 1978, pp. 1-144 (146 pages).

* cited by examiner

TUNABLE ACOUSTIC GRADIENT LENS WITH AXIAL COMPLIANCE PORTION

BACKGROUND

Technical Field

This disclosure relates to tunable acoustic gradient lenses, and more particularly to the use of tunable acoustic gradient lenses in variable focal length lens systems used for inspection and dimensional metrology.

Description of the Related Art

Various types of multi-lens variable focal length (VFL) optical systems may be utilized for observation and precision measurement of surface heights, and may be included in a microscope and/or precision machine vision inspection system, for example as disclosed in U.S. Pat. No. 9,143,674, which is hereby incorporated herein by reference in its entirety. Briefly, a VFL lens is capable of acquiring multiple images at multiple focal lengths, respectively. One type of known VFL lens is a tunable acoustic gradient ("TAG") lens that creates a lensing effect using sound waves in a fluid medium. The sound waves may be created by application of an electrical field at a TAG lens resonant frequency to a vibrating member (e.g., a piezoelectric tube) surrounding the fluid medium to create a time-varying density and index of refraction profile in the lens's fluid, which modulates its optical power and thereby the focal length or effective focus position of the vision system. A TAG lens may be used to periodically modulate a focus position at a resonant frequency of up to several hundred kHz, i.e., at a high speed. Such a lens may be understood in greater detail by the teachings in the article, "High speed varifocal imaging with a tunable acoustic gradient index of refraction lens" (*Optics Letters*, Vol. 33, No. 18, Sep. 15, 2008), and in U.S. Pat. Nos. 8,194,307, 9,213,175 and 9,256,009, each of which is hereby incorporated herein by reference in its entirety. Tunable acoustic gradient index lenses and related controllable signal generators are available, for example, from TAG Optics, Inc., of Princeton, N.J.

Limitations in the optical performance (e.g., focus range) and/or operating stability of a TAG lens may correspondingly limit the performance of a system that includes the TAG lens. Such limitations may be less critical for simple imaging applications (e.g., where the primary purpose is observation). However, in metrology systems (e.g., microscope systems, where a TAG lens is precisely calibrated to correlate a particular optical power (or focus distance) with a particular phase of the resonant cycle), such limitations may be relatively critical with regard to the system's precision and range for performing certain inspection and dimensional metrology functions. With regard to such applications, a configuration that can provide improvements with regard to the optical performance (e.g., focus range) and/or operating stability of a TAG lens would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A tunable acoustic gradient (TAG) lens is provided including a controllable acoustic wave generating element, a refractive fluid, and a lens casing surrounding a casing cavity. An operational volume of the refractive fluid is contained in the casing cavity and the controllable acoustic wave generating element is arranged inside the lens casing around an optical path that passes through the operational volume. An axial direction of the TAG lens defined as parallel to an optical axis OA of the optical path. The operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element. In various implementations, the TAG lens is included as part of a vision system and the control of the TAG lens to provide a periodically modulated optical power variation for the TAG lens correspondingly provides a focus distance variation for the vision system.

In various implementations, the lens casing case wall portion that extends generally along the axial direction, and first and second case end portions that extend generally transverse to the axial direction. Each case end portion comprises a centrally located window configuration comprising a window mounted along the optical path in a window mounting portion, and a case end rim portion that is at least partially aligned with and sealed to the case wall portion. Each window mounting portion has an overall window mount axial dimension (along the axial direction) defined between two parallel window mount boundary planes that are perpendicular to the optical axis and that respectively coincide with the furthest interior and exterior surfaces of that window mounting portion. According to principles disclosed herein, each case end portion further comprises a respective enhanced axial compliance portion that is coupled between and sealed to its associated window mounting portion and case end rim portion, and holds its associated window mounting portion in place and is configured to enhance an axial deflection amplitude of its associated window mounting portion relative to its associated case rim end portion when the periodic drive signal is applied to the acoustic wave generating element. In each case end portion, its respective enhanced axial compliance portion comprises a first reduced thickness region (e.g., corresponding to an annular groove in a case end portion, in some implementations) that is characterized by a reduced material thickness along the axial direction that is at most 75% of the overall window mount axial dimension of its associated window mounting portion. The first reduced thickness region extends generally around its associated window mounting portion over a subtended angle of at least 270 degrees around the optical axis. In various implementations, the first reduced thickness region may have a generally annular shape, and extend over a subtended angle of in the range of 270 to 360 degrees. The inventors have found that such a configuration improves the focus range and/or operating stability (e.g., the stability of the focus range and/or the stability of the resonant frequency associated with the periodic drive signal) of the TAG lens, which maintains the stability and precision of its optical power and/or focus distance calibration relative to the phase of its periodic drive signal. Any such improvements, however small, are critical to improving the utility and precision of TAG lens based metrology systems.

In some implementations, the first reduced thickness region may be characterized by a reduced material thickness along the axial direction that is at most 65%, or at most 55% (or less), of the overall window mount axial dimension of its associated window mounting portion.

In some implementations, the first reduced thickness region may comprise a first recessed surface that is coextensive with or larger than the first reduced thickness region and that is recessed along the axial direction relative to an adjacent surface of its associated case end portion and that bounds the reduced material thickness of the first reduced thickness region along the axial direction. The first recessed surface may comprise a surface portion of a groove formed in a material of a case end portion. In some implementations, the TAG lens has a generally cylindrical shape and the groove formed in the material of the case end portion may have a generally annular shape.

In various implementations, the first recessed surface of either case end portion may be located in either an exterior surface or an interior surface of that case end portion. In various implementations, a second recessed surface of either case end portion may be located in either an exterior surface or an interior surface of that case end portion. In some implementations, if the first recessed surface is located in an interior surface, then the second recessed surface is located in an exterior surface, or if the first recessed surface is located in an interior surface, then the second recessed surface is located in an exterior surface. However, such implementations are exemplary only, and not limiting.

In some implementations, in each case end portion its associated case end rim portion comprises portions defining an abutment surface plane that is nominally perpendicular to the optical axis, and all exterior surfaces of its associated window mounting portion are recessed along the axial direction relative to the abutment surface plane by a distance along the axial direction that is greater than the enhanced axial deflection amplitude of that associated window mounting portion.

In some implementations, in at least one case end portion its associated case end rim portion may include a mounting surface around its periphery that is configured to receive a mounting element (e.g., a mounting clamp) that exerts force on the mounting surface along a radial direction that is perpendicular to optical axis. The at least one case end portion may further comprise a radial strain isolation configuration comprising at least one of a radial strain accommodation channel or a radial compliance bending element that extends over a subtended angle of at least 270 degrees around the optical axis, and that is located between its mounting surface and the first reduced thickness region of its associated enhanced axial compliance portion along the radial direction. In various implementations, the TAG lens may have a generally cylindrical shape, the first reduced thickness region may be an annular region, and the radial strain accommodation channel may comprise an annular groove that is formed in an exterior end surface of that at least one case end portion.

In some implementations, at least the enhanced axial compliance portion and the window configuration of each case end portion are configured according to the various principles disclosed herein to provide a resonant mode of the TAG lens comprising axial translation of the window mounting portion relative to its associated case end rim portion, wherein the resonant bandwidth of that resonant mode, as indicated by the amplitude of the axial translation of the window mounting portion relative to its associated case end rim portion, includes the frequency of the periodic drive signal that is applied to the acoustic wave generating element.

DETAILED DESCRIPTION

Figure 1:
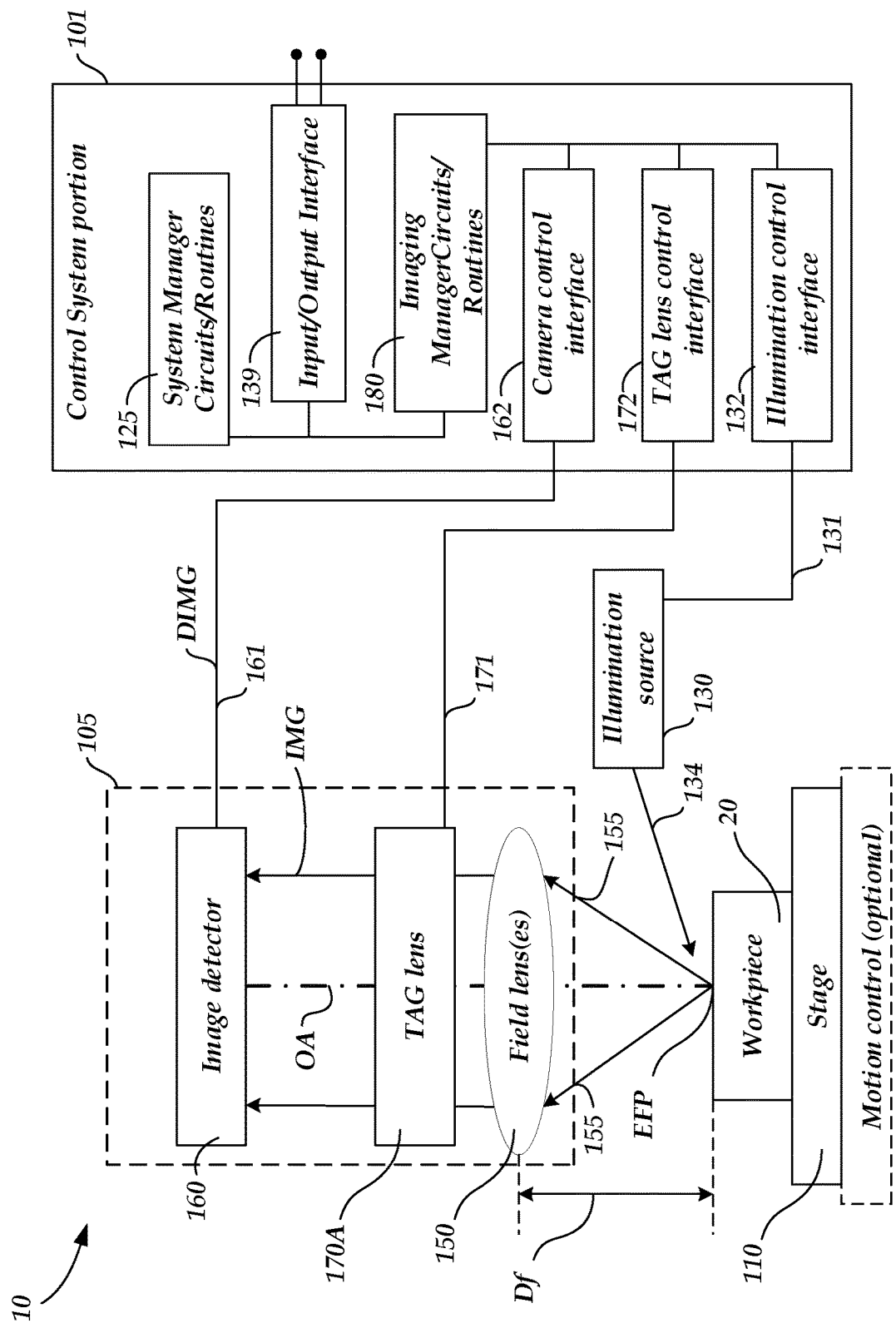
FIG. 1 is a block diagram of an optical imaging portion and a control system portion of an imaging/inspection system including a TAG lens.
Figure 2:
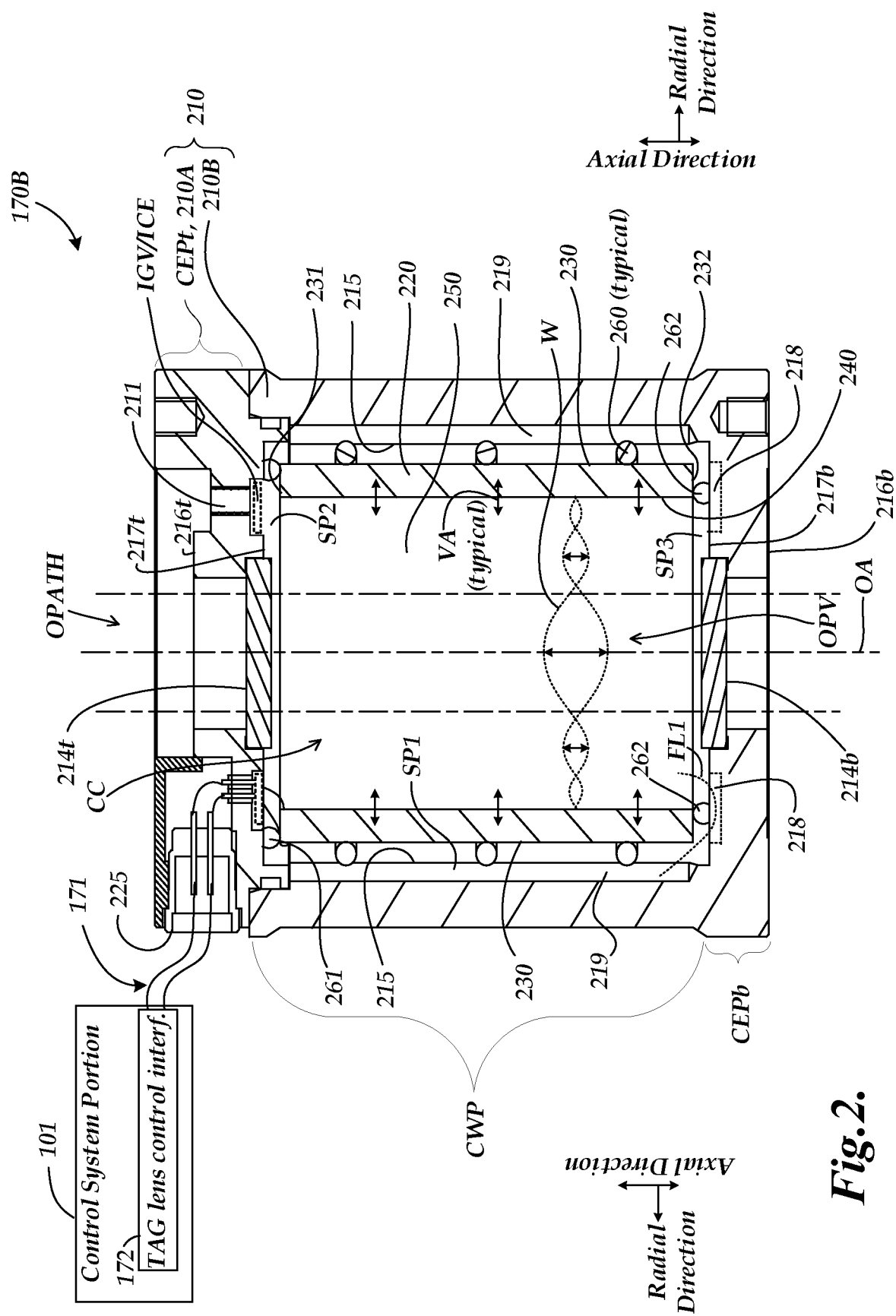
FIG. 2 is a diagram of a cross section of a TAG lens including known features, including a standing acoustic wave generated at resonance therein.

The description of FIGS. 1 and 2 provides a brief background regarding various operating principles and applications of a TAG lens used in a workpiece inspection system. To supplement this brief background with more in-depth explanation and understanding, various aspects of such operating principles and applications are described in greater detail in the previously incorporated references, and in U.S. Pat. Nos. 9,930,243; 9,736,355; and 7,627,162, each of which is hereby incorporated herein by reference in its entirety.

FIG. 1 is a block diagram of an imaging/inspection system 10 including an optical imaging system 105, an illumination source 130, a workpiece stage 110 and a control system portion 101. In various implementations, the imaging/inspection system 10 may be adapted to a machine vision host system, or used as a standalone system, and may be operated according to principles disclosed herein and in the incorporated references. The imaging/inspection system 10, including the optical imaging system 105, the illumination source 130, and the workpiece stage 110, may generally be controlled by the control system portion 101 to image or inspect a workpiece 20.

The optical imaging system 105 includes an image detector 160 (e.g., a camera), one or more field lenses 150 (e.g., including an interchangeable objective lens), and a TAG lens 170A. The control system portion 101 may include system manager circuits/routines 125, which may govern an input/output interface 139, and imaging manager circuits/routines 180. A host system, or various individual display devices or input devices, or the like, may be connected to the input/output interface 139. In some implementations the workpiece stage 110 may comprise an (optional) motion control system that moves the workpiece relative to the optical imaging system 105. In such implementations, the system manager circuits and routines 125 may include a workpiece program generator and executor (not shown), that operates the motion control system and other features of the imaging/inspection system 10, to automatically inspect the workpiece 20, as disclosed in the incorporated references. As shown in FIG. 1, the imaging manager circuits/routines 180 include or govern an illumination control interface 132, a camera control interface 162, and a TAG lens control interface 172. The TAG lens control interface 172 may include or be connected to a TAG lens controller (e.g., in a portion of the imaging manager circuits/routines 180) including circuits and/or routines for controlling various image exposures synchronized with the periodic focus position modulation provided by the TAG lens 170A. In some implementations, the TAG lens control interface 172 and a TAG lens controller may be merged and/or indistinguishable. The illumination control interface 132 may control, for example, the selection, power, on/off switch, and strobe pulse timing, if applicable, for corresponding illumination sources (e.g., illumination source 130). In some implementations, the illumination control interface 132 may include an exposure (strobe) time controller or may otherwise provide strobe timing signals (e.g., to the illumination source 130), such that they provide an image exposure strobe timing that is synchronized with a desired phase timing of the TAG lens focus position modulation. The camera control interface 162 may control, for example, the camera configuration, exposure timing, and data output and the like, if applicable. In some implementations, the camera control interface 162 may include a timing controller such that the camera image exposure timing is synchronized with a desired phase timing of the TAG lens focus position modulation and/or an illumination timing. Each of these components, as well as the additional components described below, may be interconnected by one or more data/control busses and/or application programming interfaces, or by direct connections between the various elements.

As will be described in more detail below, an imaging optical path OPATH (along the optical axis OA) comprises various optical components that convey workpiece imaging light 155 from the workpiece 20 to the image detector 160. For example, the field lens 150, TAG lens 170A and image detector 160 may all be arranged with their optical axes aligned on the same optical axis OA that intersects with the surface of the workpiece 20. However, it will be appreciated that this implementation is intended to be exemplary only, and not limiting. More generally, the imaging optical path OPATH may include mirrors and/or other optical elements, and may take any form that is operational for imaging the workpiece 20 using an image detector (e.g., the image detector 160) according to known principles. In the illustrated implementation, the imaging optical path OPATH includes the TAG lens 170A, and may be utilized for imaging and/or measuring a surface of a workpiece 20 using one or more workpiece image exposures.

As previously outlined, the optical power of the TAG lens 170A changes continuously at a high frequency in response to a resonant drive signal (e.g., as input on a signal line 171 from a TAG lens control interface 172 of the control system portion 101). The effective focus position EFP changes accordingly. In various implementations, the drive signal is a sinusoidal AC signal at a resonant frequency of operation of the TAG lens 170A. A focal length Df corresponding to an effective focus position EFP is available at a corresponding time or "phase timing" during the sinusoidally changing the optical power of the TAG lens 170A. The nominal or "midrange" effective focus position may be considered to be the (fixed) focal length of the field lens 150 (e.g., an objective lens), in combination with the TAG lens in a state where its optical power is zero. The illumination source 130 or the image detector 160 may be "strobed" at a particular phase or "phase timing" of the resonant cycle to obtain an image exposure focused at a corresponding effective focus position or focus distance. The source light 134 is reflected or transmitted as workpiece light 155, and the workpiece light used for imaging passes through the field lens 150 and the TAG lens 170A and is gathered by the image detector 160 (e.g., a camera). A workpiece image exposure which includes the image of the workpiece 20 is captured by the image detector 160, and is output on a signal line 161 to the imaging manager circuit/routines 180 (e.g., through a camera control interface 162). In various implementations, the image detector 160 may be a known charge coupled device (CCD) image sensor or other form of camera, and may receive an incident image IMG and may output to the imaging manager circuit/routines 180 a detected image DIMG having a predetermined signal form.

Known contrast-based focus analysis methods may be used to analyze the resulting image(s) and determine whether they are in focus, and/or may be used in the system manager circuits and routines 125 or the imaging manager circuits/routines 180 to adjust the strobe phase timing to provide an "autofocus" operation that provides a focused image of the workpiece 20. Alternatively, or in addition, such contrast-based focus analysis methods may be used to identify a best-focus image out of a set of images acquired at a corresponding set of known phase timings, and output that "best-focus" phase timing value. Z-height (effective focus position) calibration data may be utilized that relates respective Z-heights or effective focus positions to respective "best-focus" phase timings. Thus, the surface height coordinate of an imaged surface portion of a workpiece 20 may be determined based on the phase timing associated with its "best focus" image. Therefore, the optical imaging system 105 and/or the imaging/inspection system 10 may be used to measure or profile the workpiece 20 by scanning across it, if desired. Various aspects of such measuring processes are described in greater detail in the incorporated references.

Based on the foregoing description, in relation to the optical power and/or focus range and/or operating stability (e.g., the stability of the focus range and/or the stability of the resonant frequency associated with the periodic drive signal) of a TAG lens, it will be appreciated that improved performance and/or stability of any of these characteristics may improve the overall performance of an imaging system or other system that includes the TAG lens, and/or increase precision when used in a metrology system. A TAG lens configuration having certain known features is described in more detail below with reference to FIG. 2. Configurations according to principles disclosed herein, which provide improvements with regard to the performance and/or stability of a TAG lens, are described in more detail below with reference to FIGS. 3 through 6.

FIG. 2 is a diagram of a cross section of a TAG lens 170B including certain known features. The TAG lens 170B includes a lens casing 210 comprising a case end portion 210A (also referred to as a case end portion CEPt), and a combined case wall/case end portion 210B. As shown in FIG. 2, the combined case wall/case end portion 210B comprises a case end portion CEPb and a case wall portion CWP. the lens casing 210 surrounds the casing cavity CC. The TAG lens 1706 further includes a controllable acoustic wave generating element 220, and a refractive fluid 250. As illustrated in FIG. 2, a casing cavity CC of the lens casing 210 includes an operational volume OPV of the refractive fluid 250, and the acoustic wave generating element 220 (e.g., a piezoelectric vibrator) is arranged inside the lens casing 210 around an optical path OPATH that passes through the operational volume OPV. In various implementations (e.g., as illustrated herein) the lens casing 210 may be a hollow cylindrical case, and the controllable acoustic wave generating element 220 may be a hollow cylindrical piezoelectric vibrator that is installed on the interior of the lens casing 210.

According to a convention used herein, the suffix "t" generally indicates a feature of the "top" case end portion CEPt, and the suffix "b" generally indicates a feature of the "bottom" case end portion CEPb. It will be appreciated that the use of "top" and "bottom" is only for convenient reference to distinguish one case end portion from the other in the various figure descriptions herein. Generally speaking, a TAG lens may be used in an inverted or rotated position if desired.

In various alternative implementations, the lens casing 210 may have other shapes (e.g., a hollow hexagonal shape, or square shape, etc.). In various implementations, the controllable acoustic wave generating element 220 may be supported by spacers 260, 261 and 262 (e.g., O-rings used only for mechanical support, made of an elastomer, etc.). In various implementations, one or more spacers 260 may be disposed between an outer circumferential surface 230 of the controllable acoustic wave generating element 220 and an inner circumferential cavity wall 215 of the lens casing 210 (e.g., forming a spacing SP1). Similarly, one or more spacers 261 may be disposed between an upper surface 231 of the controllable acoustic wave generating element 220 and an upper inner surface 217t of the lens casing 210 (e.g., forming a spacing SP2), and one or more spacers 262 may be disposed between a lower surface 232 of the controllable acoustic wave generating element 220 and a lower inner surface 217b of the lens casing 210 (e.g., forming a spacing SP3).

In various implementations, the controllable acoustic wave generating element 220 vibrates in a radial direction due to a drive signal (e.g., an AC voltage that is applied between the outer circumferential surface 230 and the inner circumferential surface 240). In various implementations, the drive signal is applied through a signal line (e.g., signal line 171 of FIG. 1, as provided from the TAG lens control interface 172 of the control system portion 101) and through the electrical connector 225 to the acoustic wave generating element 220.

In various implementations, the drive signal (e.g., comprising an AC voltage) that is provided on the signal line 171 may be adjusted to a resonant frequency that produces a standing acoustic wave W in the refractive fluid 250 on the inner side of the controllable acoustic wave generating element 220 (i.e., within the portion of the casing cavity that is surrounded by the inner circumferential surface 240). In such a case, when the controllable acoustic wave generating element 220 is vibrated as indicated by representative vibration arrows VA, a standing acoustic wave W arises in the refractive fluid 250 (i.e., and concentric circular wave regions arise where the refractive index increase and decreases). It will be understood that the standing acoustic wave W produces a density gradient that provides a refractive index distribution corresponding approximately to the standing acoustic wave W. The central portion of that refractive index distribution, represented as the optical path OPATH between the vertical dashed lines, may be used for imaging.

As noted above, the casing cavity CC (e.g., as formed by the inner circumferential cavity wall 215 and the inner surfaces 217t and 217b) is filled with the refractive fluid 250. In various implementations, the refractive fluid 250 may be added to the casing cavity CC through one or more inlet/outlet ports (e.g., including an inlet/outlet port 211), which are then sealed. In various implementations, under desired operating conditions, the entire controllable acoustic wave generating element 220 is immersed in the refractive fluid 250, such that the cavity within the hollow cylindrical controllable acoustic wave generating element 220 (i.e., as surrounded by the inner circumferential surface 240) is filled with the refractive fluid 250. The vertical slots or channels 219 and radial slots or channels 218 in the lens casing 210 allow the refractive fluid 250 to flow past the various spacers (e.g., O-rings) to surround the outer circumferential surface 230 of the acoustic wave generating element 220 during and after filling. In contrast to the spacing SP1, which extends around the entire outer circumference of the acoustic wave generating element 220, it will be appreciated that the radial and vertical channels 218 and 219 are discrete channels (e.g., horizontal and vertical slots formed by drilling or other processes in the lens casing 210). The refractive fluid 250 is able to flow from the cavity within the inner circumferential surface 240 into the radial channel(s) 218 and through the spacings SP (e.g., spacings SP1 and SP3) produced by the spacers (e.g., spacers 260 and 262) and into the vertical channel(s) 219. In this manner, the refractive fluid 250 is also able to fill the spacings SP1, SP2 and SP3 between the acoustic wave generating element 220 and the inner circumferential cavity wall 215 and the upper and lower inner surfaces 217t and 217b of the casing cavity CC of the lens casing 210, so as to surround the outside of the acoustic wave generating element 220. The TAG lens 170B also includes top and bottom windows 214t and 214b, that are disposed at upper and lower portions of the casing cavity CC, respectively, and sealed against it. The optical path OPATH that passes through a center of the TAG lens 170B (e.g., as centered along the optical axis OA) passes through the upper and lower windows 214t and 214b.

It should be appreciated that the resonant frequency outlined previously is a property of the overall system. As described in more detail in copending and commonly assigned U.S. patent application Ser. No. 16/000,319, entitled "External Reservoir Configuration For Tunable Acoustic Gradient Lens", filed on Jun. 5, 2018, (hereinafter the '319 application), which is hereby incorporated herein by reference in its entirety, the resonant frequency may be sensitive to variations in factors such as temperature, and/or pressure, and/or mechanical stresses. The lensing characteristics of the resulting standing acoustic wave W may similarly be sensitive to variations in such factors. Therefore, the TAG lens 170B may vary from the operating state used to establish the aforementioned calibration data (the data that characterizes the effective focus position EFP or optical power vs. phase timing values), and height measurement errors may arise as a result. The resulting errors may be small, but they are significant in precision measurement applications. The various principles and configurations disclosed in the '319 application are directed to reducing variations in the driving factors noted above, as well as to reducing variations due to movement and/or inadequacy of a previously known and used type of compressible element IGV/ICE, or the like.

Regarding the compressible element IGV/ICE, one configuration is represented in FIG. 2 by dashed outlines which represent an approximate cross section of an annular compressible element intended to be constrained in a corresponding annular recess. The annular compressible element IGV/ICE has been known to be an intentional gas volume, or a closed-cell foam element, or the like. It should be emphasized that the annular recess illustrated as corresponding to the annular compressible element IGV/ICE has been known to have dimensions based only on the dimensions thought to be desirable for the compressible element IGV/ICE. In general, known annular compressible elements IGV/ICE have been inadequate to their intended purpose, as disclosed in the '319 application, and therefore their dimensions have had no specific range of values or justification. Accordingly, the annular recess illustrated as corresponding to the annular compressible element IGV/ICE as illustrated in FIG. 2 is only a schematic representation for purposes of explanation (e.g., according to the explanation disclosed in the '319 application.) Likewise, the dimensions of the recess shown in the surface 216$t$ of the case end portion CEPt shown in FIG. 2 have had no specific range of values or justification. One purpose of such a recess has been to make the fluid filling of the casing cavity CC through the inlet/outlet port 211 easier and/or neater. Accordingly, the recess illustrated shown in the surface 216$t$ of the case end portion CEPt in FIG. 2 is only a schematic representation.

In contrast to various annular recesses shown further below in FIGS. 3-6B, in FIG. 2 the illustrated dimensions of the various recesses that are shown are not specified or meaningful in the sense disclosed herein, and their function is not directed to influencing the axial compliance of the case end portion CEPt (210A). To avoid confusion, as described elsewhere herein it will be understood that the individual radial slots 218 shown in dashed outline in FIG. 2 illustrate thin radial flow channels under the spacer 262, not an annular recess. The desirability of providing enhanced axial compliance of the case end portion CEPt was unknown prior to its disclosure herein, and the dimensions and placement of recesses in prior art case end portions CEP are only incidental and not meaningful in this regard.

Figure 3:
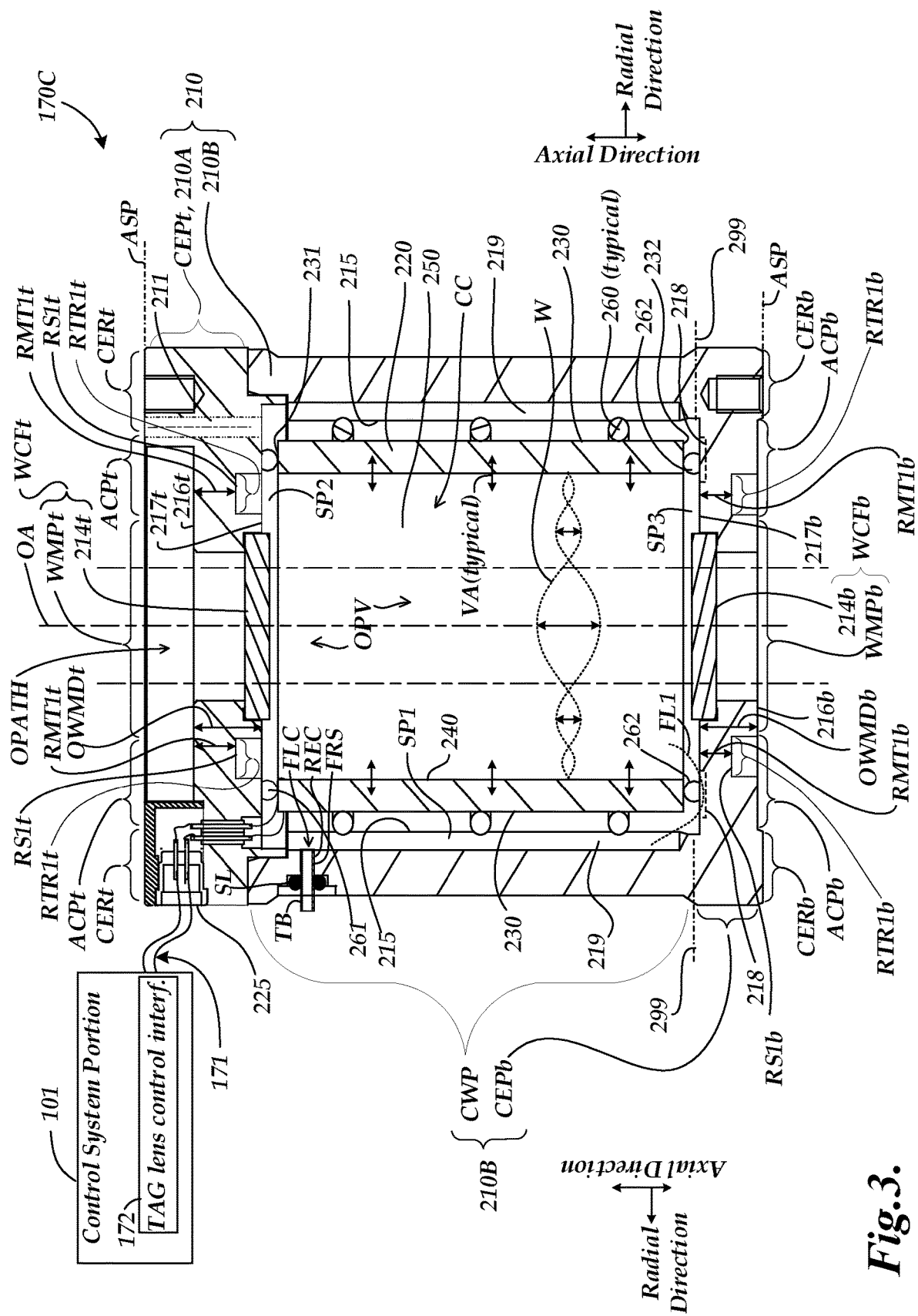
FIG. 3 is a diagram of a cross section of a TAG lens with a first exemplary implementation of a lens casing including a first exemplary implementation of using an enhanced axial compliance portion in each case end portion.
Figure 4:
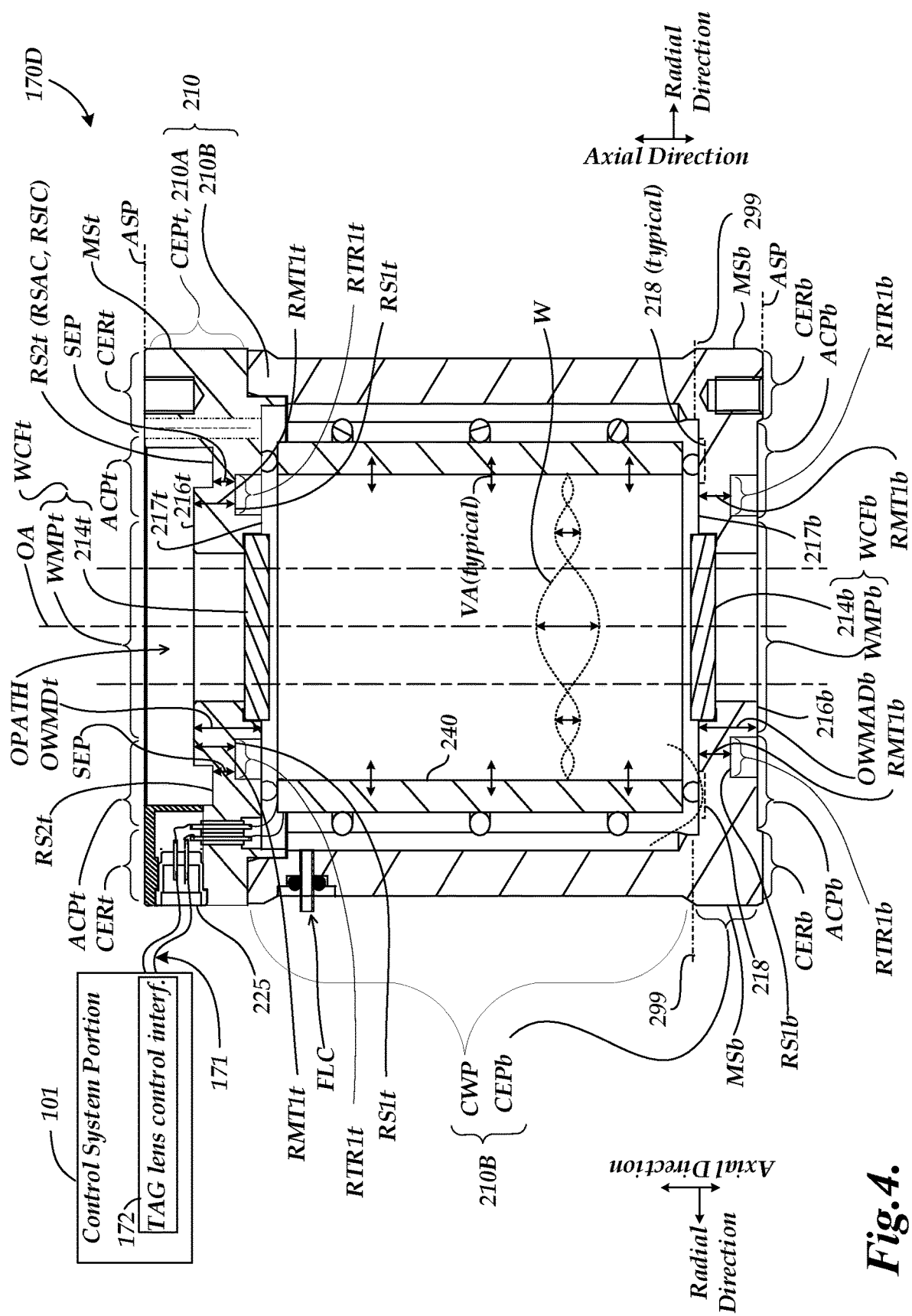
FIG. 4 is a diagram of a cross section of a TAG lens with a second exemplary implementation of a lens casing including a second exemplary implementation of using an enhanced axial compliance portion in each case end portion.
Figure 5:
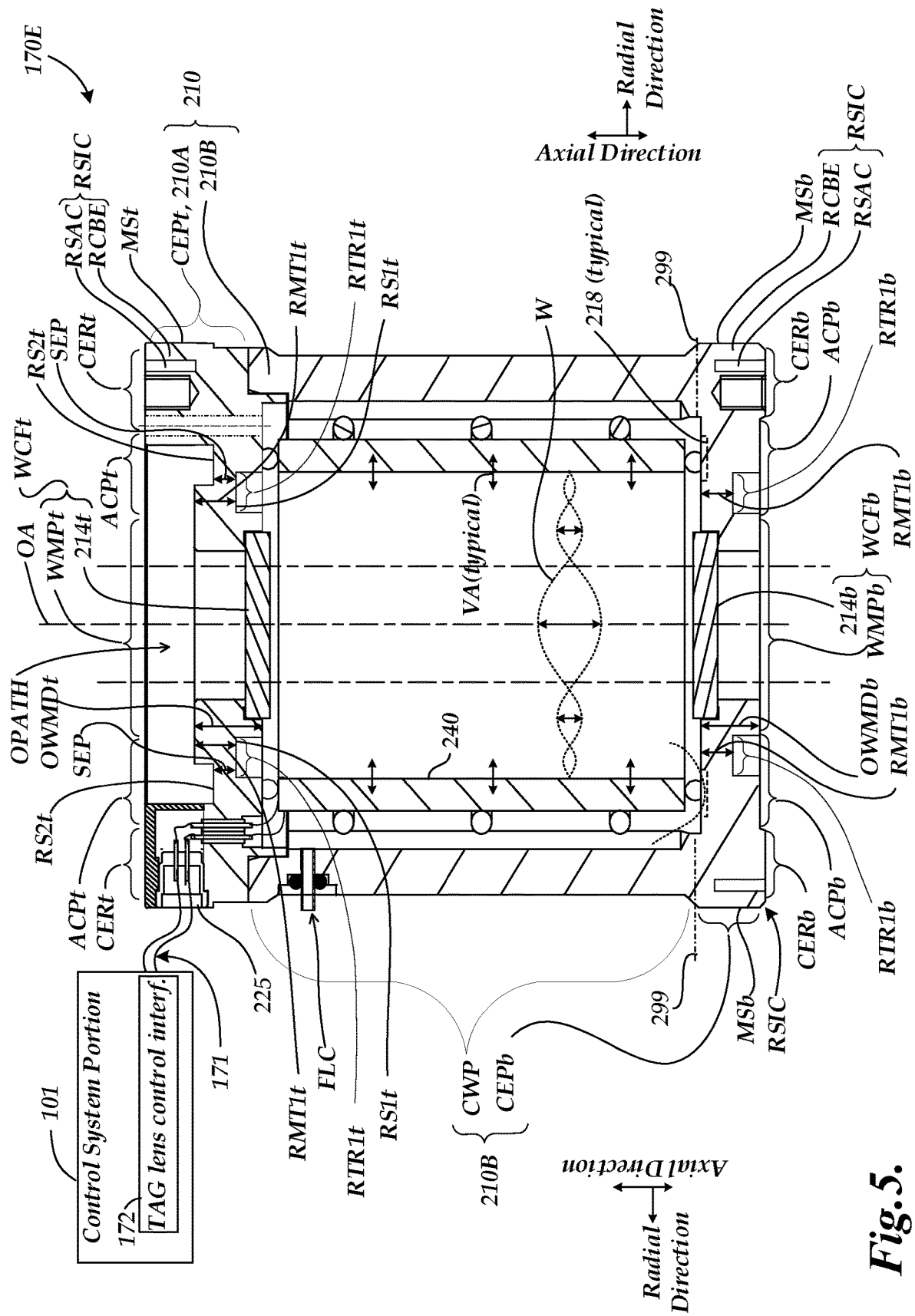
FIG. 5 is a diagram of cross sections of a TAG lens with a third exemplary implementation of a lens casing including a third exemplary implementation of using an enhanced axial compliance portion in combination with a radial strain isolation configuration in each case end portion.
Figures 6A, 6B:
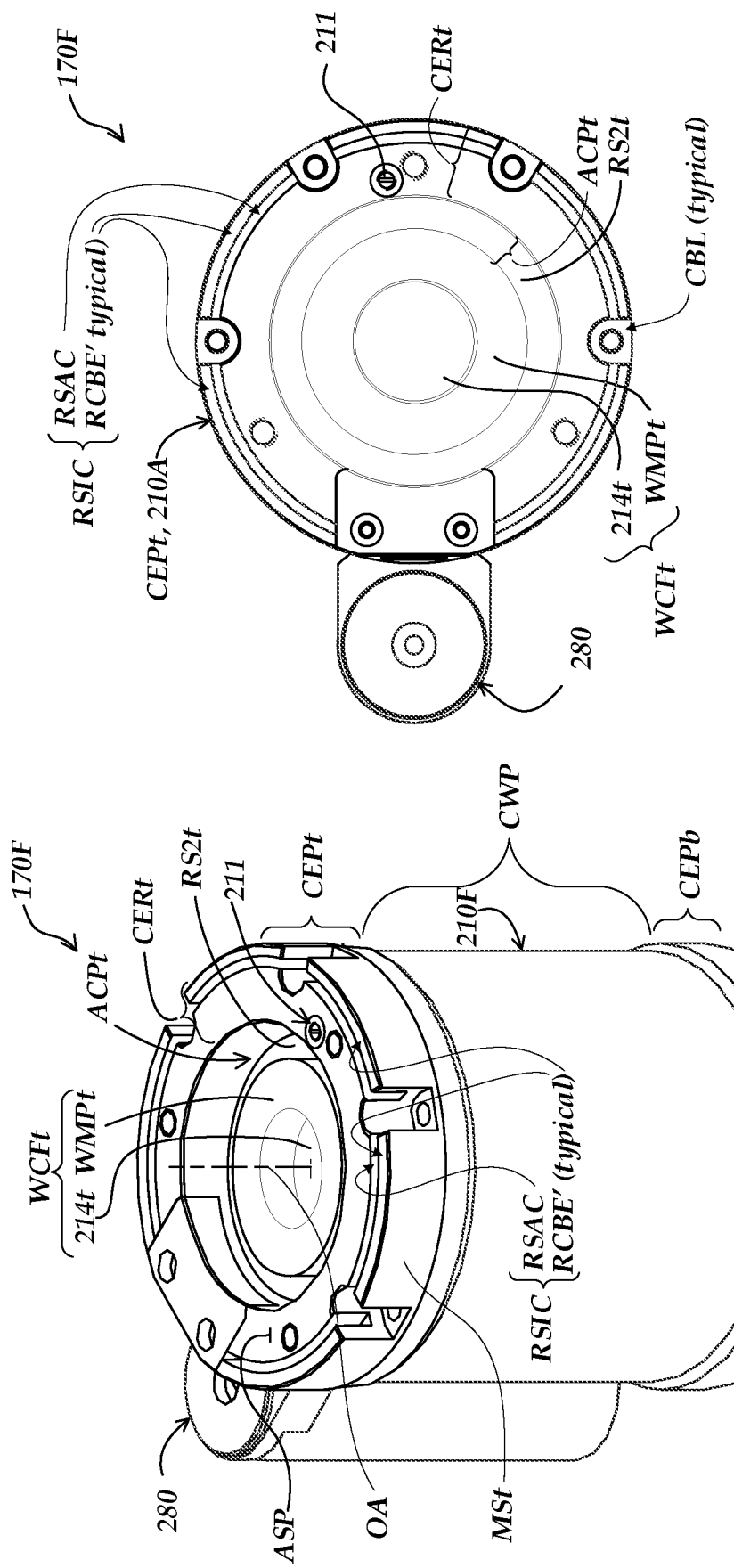
FIGS. 6A and 6B are diagrams of isometric and top views of the TAG lens shown in FIG. 5, including a generic implementation of an external reservoir configuration.

As described in the '319 application, in order to achieve an improved configuration which also eliminates and supersedes the annular compressible element IGV/ICE and its corresponding annular recess, the casing cavity CC may be connected by a flow channel FLC (e.g., as illustrated in FIGS. 3, 4 and 5 herein) to an external reservoir configuration 280 (e.g., as illustrated in FIGS. 6A and 6B herein) which includes a deformable external fluid reservoir that contains a reserve volume of the refractive fluid 250. The flow channel FLC enables the refractive fluid 250 to flow back and forth between the casing cavity CC and the deformable external fluid reservoir in accordance with expansion and contraction of the refractive fluid (e.g., due to changes in temperature), which has certain advantages for addressing various issues as described in the '319 application.

As will be described in more detail below with respect to FIGS. 3-6B, various principles are disclosed herein which are directed to improvements in the optical performance of a TAG lens. In relation to the optical performance, as described above, the optical lensing of a TAG lens 170 may be achieved by the cyclic compression of the refractive fluid 250 (e.g., silicone oil) by the vibrating motion of the acoustic wave generating element 220 (e.g., a piezoelectric cylinder). When the refractive fluid 250 experiences a change in pressure, there is a corresponding change in the index of refraction of the refractive fluid 250, creating a change in the optical power of the TAG lens 170 (e.g., in some implementations most importantly near the central optical axis OA of the TAG lens 170). In various implementations, the optical power may be proportional to the integral of the compression of the refractive fluid 250 along the length of the optical axis OA, such that more average peak compression of the refractive fluid 250 along the full length of the lens optical axis OA may result in higher/improved optical power.

As a brief overview of the configurations of FIGS. 3-6B, in various implementations, more compression of the refractive fluid 250 may be able to be achieved by causing the acoustic wave generating element 220 to vibrate with a larger average displacement along its full length along the optical axis OA. The lens casing 210 acts to contain the refractive fluid 250, hold the acoustic wave generating element 220 aligned with the optical axis OA, and provide a structure for mounting the TAG lens 170 into an optical system (e.g., in which the lens casing 210, and in particular case end portions CEP, may be clamped and/or otherwise attached to supporting structures or other components in an optical system, etc.). The acoustic wave generating element 220 is mechanically coupled to the lens casing 210 by both the refractive fluid 250 and the spacers 260, 261 and 262 (e.g., O-rings used for mechanical support, made of an elastomer, etc.) that are positioned along the side and top and bottom edges of the acoustic wave generating element 220. In various implementations, in order for the acoustic wave generating element 220 to achieve large displacements, it may be desirable for the lens casing 210 to vibrate and/or deflect in a mode or manner that supports the motion of the acoustic wave generating element 220 in compressing the refractive fluid 250 along the optical axis OA.

As described in greater detail below in relation to FIGS. 3-6B, the inventors have determined that it is desirable for a central portion (e.g., a window configuration WCF) of either or both case end portion(s) CEP to deflect slightly along the axial direction in response to motion of the acoustic wave generating element 220 and the associated fluid pressures, so that instead of acting as a stiff resistance to the motion of the acoustic wave generating element 220, the window configuration WCF may move slightly (e.g., with an enhanced axial deflection on the order of tens to hundreds of nanometers) in cooperation with the motion of the acoustic wave generating element 220 (e.g., so as to reinforce the motion/vibration and increase the overall amplitude of the motion/vibration of the acoustic wave generating element 220). As will be described in more detail below, in various implementations such motion and corresponding effects may be enabled/increased/enhanced by inclusion of an axial compliance portion ACP in either, or preferably both, of the case end portions CEPt and CEPb (e.g., as shown in FIG. 3 and FIG. 4). As noted above, in various implementations an external reservoir configuration (e.g., in accordance with the teachings of the '319 application) may also be included (e.g., as shown in FIGS. 6A and 6B).

With regard to any of the various configurations described herein (e.g., with regard to any of the TAG lenses 170C-170F of FIGS. 3-6B), in some implementations it may be desirable to tune the mass and stiffness of one or both window configurations WCF and their associated enhanced axial compliance portion(s) ACP, along with the rest of the overall TAG lens system, so that the system naturally supports (e.g., resonates with) the motion/vibration of the acoustic wave generating element 220 at a frequency (or frequencies) that is utilized to drive the TAG lens 170. In various implementations, the window configuration WCF and/or the axial compliance portion ACP that supports it may be configured have a resonant frequency that may be at least partially responsive to the operating frequency of the TAG lens 170. With regard to such considerations, in various implementations it may be desirable to tune/utilize a size or mass of window configuration WCF (e.g., including the relative size of the window 214) that interacts with the configuration stiffness of the axial compliance portion ACP so as to achieve a desirable deflection/vibration amplitude of the window configuration WCF along the axial direction (e.g., for a given drive frequency). In various implementations, according to one design method, at least the enhanced axial compliance portion ACP and the window configuration WCF of each case end portion CEP are configured to provide a resonant mode of the TAG lens comprising axial translation of the window mounting portion relative to its associated case end rim portion, wherein the resonant bandwidth of that resonant mode, as indicated by the amplitude of the axial translation of the window mounting portion relative to its associated case end rim portion, includes the frequency of the periodic drive signal that is applied to the acoustic wave generating element. In general, the implementations disclosed may desirably provide an efficient resonant system that achieves high average displacement/motion/vibration of the acoustic wave generating element 220 (e.g., with minimum input electrical energy, etc.).

FIG. 3 is a diagram of a cross section of a TAG lens 170C with a first exemplary implementation of a lens casing 210 including a first exemplary implementation of using an enhanced axial compliance portion ACP in each case end portion CEP. It will be appreciated that elements similarly numbered or designated in FIG. 3 and FIG. 2 may have an analogous or identical function and/or configuration and may be understood by analogy to previous description except as otherwise indicated by description or context. Therefore, only significant differences and/or new features are described in detail below. This numbering scheme to indicate elements having analogous function and/or configuration is also applied to following FIGS. 4-6B. In some cases, reference numbers for obviously similar or identical elements in later figures are omitted to avoid visual clutter and more clearly show and emphasize new or different elements introduced on those later figures. Such similar or identical elements may be recognized in the various figures and may be understood by analogy to previous description except as otherwise indicated by description or context.

Similarly to the TAG lenses 170A and 170B, the TAG lens 170C of FIG. 3 includes the controllable acoustic wave generating element 220 and the refractive fluid 250, with the lens casing 210 surrounding the casing cavity CC. The operational volume OPV of the refractive fluid 250 is contained in the casing cavity CC, and the controllable acoustic wave generating element 220 is arranged inside the lens casing 210 around the optical path OPATH that passes through the operational volume OPV. The operational volume OPV of the refractive fluid 250 is capable of changing its refractive index along the optical path OPATH in response to application of an acoustic wave by the acoustic wave generating element 220, in accordance with which the TAG lens 170C is controlled to provide a periodically modulated optical power variation for the TAG lens 170C when a periodic drive signal is applied to the acoustic wave generating element. As described above, in various implementations the TAG lens 170C may be included as part of a vision system 10, and the control of the TAG lens 170C to provide a periodically modulated optical power variation for the TAG lens 170C correspondingly provides a focus distance variation for the vision system 10.

As will be described in more detail below, one primary difference from the TAG lens 170B of FIG. 2, is that the TAG lens 170C of FIG. 3 includes an enhanced axial compliance portion ACPb in the case end portion CEPb and an enhanced axial compliance portion ACPt in the case end portion CEPt, as described in greater detail below. The TAG lenses illustrated herein may have a generally cylindrical shape, and many of the features outlined below may be understood to be illustrated as cross sections of partially or completely annular regions, wherein similarly labeled designators at the left and right of an illustrated TAG lens (e.g., CERt in FIG. 3) will be understood to refer to diametrically opposite portions of the same "annular" region or feature.

The lens casing comprises a case wall portion CWP that extends generally along the axial direction and top and bottom case end portions CEPt and CEPb that extend generally transverse to the axial direction. The top case end portion CEPt comprises a centrally located window configuration WCFt comprising a window 214t mounted along the optical path OPATH in a window mounting portion WMPt (approximately corresponding the indicated bracket), and a case end rim portion CERt (approximately corresponding to the indicated brackets) that is at least partially aligned with and sealed to the case wall portion CWP, e.g., by fastening and sealing at the joint therebetween according to known methods. Similarly, the bottom case end portion CEPb comprises a centrally located window configuration WCFb comprising a window 214b mounted along the optical path OPATH in a window mounting portion WMPb (approximately corresponding to the indicated bracket), and a case end rim portion CERb (approximately corresponding to the indicated brackets) that is at least partially aligned with and sealed to the case wall portion CWP, e.g., by being integrally formed with and connected to the case wall portion CWP at the dashed lines 299.

Each window mounting portion WMPt (or WMPb) has a respective overall window mount axial dimension OWMDt (or OWMDb) defined between two parallel window mount boundary planes that are perpendicular to the optical axis and that respectively coincide with the furthest interior and exterior surfaces of that window mounting portion.

The top case end portion CEPt further comprises a respective enhanced axial compliance portion ACPt (approximately corresponding to the indicated brackets) that is coupled between and sealed to its associated window mounting portion WMPt and case end rim portion CERt (e.g., by being integrally formed therewith, as illustrated) and holds its associated window mounting portion WMPt in place and is configured to enhance an axial direction deflection amplitude of its associated window mounting portion WMPt relative to its associated case rim end portion CERt when the periodic drive signal is applied to the acoustic wave generating element 220. Similarly, the bottom case end portion CEPb further comprises a respective enhanced axial compliance portion ACPb (approximately corresponding to the indicated brackets) that is coupled between and sealed to its associated window mounting portion WMPb and case end rim portion CERb (e.g., by being integrally formed therewith, as illustrated) and holds its associated window mounting portion WMPb in place and is configured to enhance an axial direction deflection amplitude of its associated window mounting portion WMPb relative to its associated case rim end portion CERb when the periodic drive signal is applied to the acoustic wave generating element 220.

According to principles disclosed herein, in each case end portion CEPt (or CEPb) its respective enhanced axial compliance portion ACPt (or ACPb) comprises a first reduced thickness region RTR1t (or RTR1b) that is characterized by a reduced material thickness RMT1t (or RMT1b) along the axial direction that is at most 75% of the overall window mount axial dimension OWMDt (or OWMDb) of its associated window mounting portion WMPt (or WMPb), and that extends around its associated window mounting portion over a subtended angle of at least 270 degrees around the optical axis (e.g., as shown more clearly in FIGS. 6A and 6B). In general, for best optical performance of a TAG lens, it is preferred that an enhanced axial compliance portion has axial symmetry and subtends an angle of 360. However, due to practical considerations (e.g., connectors and/or mounting considerations, or the like) this may not be possible in all implementations. In such implementations, an "incomplete" or compromised enhanced axial compliance portion that does not extend over a full 360 degrees may still provide some of the benefits described herein.

It may be desirable that the window mounting portions overall window mount axial dimensions OWMDt and OWMDb be relative thick (e.g., 8 millimeters, or more) in order to provide a relative stiff and protective mount for the brittle windows 214t and 214b and their associated seals to the window mounting portions WMPt and WMPb. When an enhanced axial compliance portion is included in each case end portion CEPt and CEPb, the inventors have determined that enhanced TAG lens operation may be obtained when the reduced material thickness RMT1t (or RMT1b) is reduced to at most 75% of the overall window mount axial dimension OWMDt (or OWMDb). In some implementations, it may be more advantageous when the reduced material thickness RMT1t (or RMT1b) is reduced to at most 65%, or at most 55%, of the overall window mount axial dimension OWMDt (or OWMDb). This may be influenced, for example, by the width and/or shape of the first reduced thickness region RTR1t (or RTR1b), the presence of more than one axial thickness reducing feature or groove in the enhanced axial compliance portion ACPt (or ACPb), and so on. It will be appreciated that a TAG lens operates at a frequency of tens or hundreds of kHz, and a relatively stiff and stable lens structure is both necessary and desirable at such frequencies. It will be understood "enhanced compliance" is thus a relative term, intended to be associated with enhancing the axial direction deflection amplitude of the window mounting portions WMPt and WMPb on the order of tens to a few hundred nanometers at the TAG lens operating frequency (in comparison to previously known TAG lens structures), according to principles disclosed and claimed herein.

In the implementation shown in FIG. 3, in each case end portion CEPt (or CEPb) its reduced thickness region RTR1t (or RTR1b) comprises a first recessed surface RS1t (or RS1b) that is coextensive with or larger than its corresponding first reduced thickness region, and that is recessed along the axial direction relative to an adjacent surface of its associated case end portion CEPt (or CEPb) and that bounds the reduced material thickness of its corresponding first reduced thickness region RTR1t (or RTR1b) along the axial direction. In the particular implementation shown in FIG. 3, the first recessed surface RS1t (RS1b) is a flat surface that is parallel to the opposing surface 216t (217b), and it is therefore coextensive with its corresponding first reduced thickness region. It will be appreciated that in other embodiments, the first recessed surface (e.g., analogous to RS1t or RS1b) may comprise a curved or slanted surface if desired. In such a case, the first recessed surface may be larger than the corresponding first reduced thickness region, wherein only the "deeper" parts of the first recessed surface may fulfill the condition requiring that its corresponding first reduced thickness region have a thickness that is at most at most 75% of its associated overall window mount axial dimension. Furthermore, it should be understood that, depending on the shape or profile of the first recessed surface, different portions of the first reduced thickness region may have different material thicknesses. It will be understood that, provided that the different material thicknesses of any such portions are at most 75% of the associated overall window mount axial dimension (e.g., the overall window mount axial dimension OWMDt or OWMDb), then such portions satisfy previously outlined criteria related to the definition and requirements of an enhanced axial compliance portion ACPt or ACPb, according to the principles disclosed herein.

In the implementation shown in FIG. 3, the case end portion CEPt (or CEPb) comprises a window mounting portion WMPt (or WMPb), case end rim portion CERt (or CERb) and enhanced axial compliance portion ACPt (or ACPb) that are all formed in a single continuous piece of material, wherein the first recessed surface RS1t (or RS1b) comprises a surface portion of a groove formed in the single continuous piece of material. In the illustrated implementation, the TAG lens 170C may have a generally cylindrical shape (e.g., as shown in FIGS. 6A and 6B) and the groove formed in the single continuous piece of material may be an annular groove (e.g., extending around all or most of 360 degrees.) However, it will be appreciated that in various other implementations of any configuration according to the principles disclosed herein the various elements of a case end portion CEPt (or CEPb) may be formed as individual elements and welded, brazed, or otherwise joined according to known methods to form an operational case end portion, if desired. In the implementation shown in FIG. 3, the first recessed surface RS1t is located in the interior surface 217t of the case end portion CEPt, and the first recessed surface RS1b is located in the exterior surface 216b of the case end portion CEPb. However, such a configuration is exemplary only, and not limiting. More generally, a first recessed surface may be located in either an interior or exterior surface in either case end portion.

As shown in FIG. 3, in various implementations a TAG lens 170 (e.g., 170C) may be assembled in an optical system with the lens casing 210 abutting other components of the optical system on the bottom and/or top ends of the lens casing 210 on an abutment surface plane ASP of the case end portions CEPt and/or CEPb, in order to provide a specified or known spacing along the axial direction for optical design purposes. An abutment surface plane ASP is also shown in FIGS. 6A and 6B. In accordance with principles disclosed herein, all exterior surfaces of a window mounting portion WMPt or WMPb of an associated window configuration WCFt or WCFb may be recessed along the axial direction relative to the abutment surface plane ASP by a distance along the axial direction that is greater than the enhanced axial deflection amplitude of that window mounting portion. Such a configuration allows the window configuration WCFt or WCFb to move/vibrate/deflect (e.g., in resonance with the acoustic wave generating element 220) relative to the case end rim portion CERt or CERb without contacting any mating surfaces that may abut the abutment surface plane ASP.

As shown in FIG. 3, a TAG lens 170 (e.g., 170C) may include a flow channel FLC that enables the refractive fluid 250 to flow back and forth to an external reservoir configuration (e.g., the external reservoir configuration 280 as illustrated in FIGS. 6A and 6B) in a sealed system, which has advantages for addressing certain issues as described in the previously incorporated '319 application. In the example implementation of FIG. 3, the illustrated flow channel FLC comprises a tube TB that may extend between the lens casing 210C (e.g., extending into a reservoir exchange channel REC) and an external reservoir configuration, and through which the refractive fluid 250 is enabled to flow back and forth between the casing cavity CC and the external reservoir configuration. One or more sealing elements SL (e.g., sealing rings) may be included (e.g., as located around the tube TB and for sealing the connection between the lens casing 210 and the external reservoir configuration) to ensure sealed containment of the refractive fluid 250. Other aspects associated with the flow channel FLC and an external reservoir configuration may be understood by reference to the '319 application.

FIG. 4 is a diagram of a cross section of a TAG lens 170D with a second exemplary implementation of a lens casing 210 including a second exemplary implementation of using an enhanced axial compliance portion ACPt in the case end portion CEPt. The various features of the TAG lens 170D that are similarly numbered or depicted in previously described TAG lens configurations (e.g., in FIG. 2 and FIG. 3) may be understood to be similar or analogous to their previously described counterparts, except as otherwise indicated below.

As shown in FIG. 4, the enhanced axial compliance portion ACPt in the case end portion CEPt further includes a second recessed surface RS2t located in an exterior surface 216t of the case end portion CEPt. The second recessed surface RS2t is recessed along the axial direction relative to an adjacent surface (e.g., the surface 216t) of its associated case end portion, and extends around its associated window mounting portion WMPt over a subtended angle of at least 270 degrees around the optical axis. In some implementations, it may be desirable if both the first and second recessed surfaces RS1t and RS2t extend over a subtended angle of 360 degrees around the optical axis, to provide the best possible aberration-free optical performance.

In the implementation shown in FIG. 4, the second recessed surface RS2t is configured to align with part of the first recessed surface RS1t along the axial direction and the second recessed surface RS2t bounds the reduced material thickness of part of the first reduced thickness region RTR1t along the axial direction (e.g., the part corresponding to the dimension SEP shown in FIG. 3.) Thus, it will be understood that a portion of the first reduced thickness region RTR1t has a material thickness RMT1t, that is at most 75% of the overall window mount axial dimension OWMDt, and a portion of the first reduced thickness region RTR1t has a material thickness SEP which is less than the material thickness RMT1t. It will be understood that, generally speaking, such a configuration allows more design freedom for configuring the enhanced axial compliance portion. For example, the illustrated implementation further increases the axial compliance of the enhanced axial compliance portion ACPt of the TAG lens 170D relative to the enhanced axial compliance portion ACPt of the TAG lens 170C shown in FIG. 3. It also changes the location of the neutral bending axis of the enhanced axial compliance portion ACPt of the TAG lens 170D to more closely align with the center of mass of its associated window mounting portion WMPt, which may be useful for diminishing unwanted asymmetric (e.g., torsional) resonant mode shapes, or the like. However, the implementation shown in FIG. 4 is exemplary only and not limiting. In other implementations, a second recessed surface analogous to the second recessed surface RS2t may be configured to completely align with the first recessed surface RS1t along the axial direction (such that its corresponding reduced material thickness is the same as the dimension SEP everywhere), or it may be configured to not align with any part of the first recessed surface RS1t along the axial direction. In the latter configuration the separation distance SEP may be defined as the dimension or distance along the axial direction between first and second planes that are perpendicular to the optical axis OA and that respectively coincide with the furthest recessed portions of the first and second recessed surfaces. In some such configurations, the inventors have determined that it may be advantageous if the separation distance SEP is at most 55% of the overall window mount axial dimension OWMDt of the associated window mounting portion WMPt.

FIG. 4 shows a mounting surface MSt which extends around the periphery of the case end portion CEPt on its associated case end rim portion CERt (except on the vicinity of the electrical connector 225 and its associated cover.) FIG. 4 also shows a mounting surface MSb which extends around the periphery of the case end portion CEPb on its associated case end rim portion CERb. In various implementations, a TAG lens may include either or both such mounting surfaces. The mounting surface MSt (or MSb) may be configured to receive a mounting element that that exerts force on the mounting surface MSt (or MSb) along the radial direction (e.g., a compressive mounting clamp that interfaces to the mounting surface). It will be understood that the force exerted by such a mounting element may stress or deform the case end rim portion CERt (or CERb) or the entire case end portion CEPt (or CERb) in a way that is different from system calibration conditions, is unstable over time, and/or changes due to operating temperature variations, or the like. Such instability is detectable in the resulting optical measurements (e.g., measurement drift in the range of microns) when a TAG lens is used in a precision metrology system.

It will be appreciated that although the second recessed surface RS2t is shown only in the top case end portion CEPt in FIG. 4, this implementation is exemplary only and not limiting. In various implementations, the first recessed surface of either case end portion may be located in either an exterior surface or an interior surface of that case end portion. In various implementations, a second recessed surface of either case end portion may be located in either an exterior surface or an interior surface of that case end portion. In some implementations, if the first recessed surface is located in an interior surface, then the second recessed surface is located in an exterior surface, or if the first recessed surface is located in an interior surface, then the second recessed surface is located in an exterior surface. These and other implementations including additional recessed surfaces in an enhanced axial compliance portion ACP are possible according to the principles disclosed and claimed herein.

The inventors have determined that in addition to its function in the enhanced radial compliance portion ACPt, the second recessed surface RS2t located in an exterior surface 216t of the case end portion CEPt as shown in FIG. 4 may have a second function, wherein it acts as a radial strain isolation configuration RSIC that is located along the radial direction between the case end rim portion CERt (which includes the mounting surface MSt) and the first reduced thickness region RTR1t of the enhanced axial compliance portion ACPt. According to one type of explanation or description, the groove or channel associated with the second recessed surface RS2t may be considered a radial strain accommodation channel RSAC that allows minute strain (e.g., radial deflections or "rolling") of the adjacent case end rim portion CERt to be at least partially accommodated or isolated, such that the strain that would otherwise be transmitted to stress or distort the relatively compliant enhanced radial compliance portion ACPt, or other structures of the case end portion CEPt that are radially interior to the radial strain accommodation channel RSAC, is significantly reduced. This results in more stable operation of the TAG lens 170D, and is synergistic with the use of enhanced axial compliance portions ACP as disclosed herein. To summarize, according to an alternative description of the TAG lens 170D that emphasizes the radial strain isolation configuration RSIC, in one implementation the TAG lens 170D comprises a generally cylindrical shape and its first reduced thickness region RTR1t may be an annular region, and it comprises a radial strain isolation configuration RSIC that is located along the radial direction between the case end rim portion CERt and the first reduced thickness region RTR1t of the enhanced axial compliance portion ACPt. In particular, in the illustrated implementation, the radial strain isolation configuration RSIC comprises the radial strain accommodation channel RSAC, which is an annular groove (corresponding to the second recessed surface RS2t) that is formed in an exterior surface 216t of the case end portion CEPt and located along the radial direction between the case end rim portion CERt and the first reduced thickness region RTR1t of the enhanced axial compliance portion ACPt.

Based on the description and/or explanation outlined above, it may be recognized that the radial strain isolation configuration RSIC shown FIG. 4 is exemplary only, and not limiting. The radial strain isolation configuration RSIC that is shown in FIG. 4 is located along the radial direction between the case end rim portion CERt and the first reduced thickness region RTR1t of the enhanced axial compliance portion ACPt. However, for a TAG lens such as those disclosed herein including a mounting surface MS as outlined above, a radial strain isolation configuration RSIC may be more generally located in a case end portion CEP at any desired location along the radial direction between its mounting surface MS and the first reduced thickness region RTR1 of its enhanced axial compliance portion ACP. In various implementations, a case end portion that includes a mounting surface MS around its periphery (e.g., as outlined above) may include a radial strain isolation configuration RISC that comprises at least one of a radial strain accommodation channel RSAC or a radial compliance bending element RCBE (described further below) that extends over a subtended angle of at least 270 degrees around the optical axis OA and that is located along the radial direction between its mounting surface MS and the first reduced thickness region RTR1 of its associated enhanced axial compliance portion ACP. One alternative radial strain isolation configuration that conforms to the description outlined above is disclosed below.

FIG. 5 is a diagram of cross sections of a TAG lens 170E with a third exemplary implementation of a lens casing 210 including a third exemplary implementation of using an enhanced axial compliance portion ACP in each case end portion CEP, in combination with a radial strain isolation configuration RISC that may be used in one or both case end portions CEP. The majority of elements and features in the case end portions CEPt and CEPb shown in FIG. 5 are similar to those shown in FIG. 4, and may be similarly understood. Therefore, only the significant differences associated with the radial strain isolation configuration RISC shown in FIG. 5 are described below.

As shown in FIG. 5, the radial strain isolation configuration RISC comprises a radial strain isolation channel RSAC and a radial compliance bending element RCBE that each will be understood to extend over a subtended angle of at least 270 degrees around the optical axis. It will be understood that the radial compliance bending element RCBE may comprise a continuous section around the subtended angle in some implementations, or in other implementations it may comprise a set of sections RCBE' that extend around the subtended angle as a set (e.g., as shown in FIGS. 6A and 6B). The radial strain isolation channel RSAC and/or the radial compliance bending element RCBE are each located in a case end portion CEPt (or CEPb) between the mounting surface MS and the first reduced thickness region of its associated enhanced axial compliance portion ACPt (or ACPb) along the radial direction. In the illustrated implementation, the TAG lens 170E may comprise a generally cylindrical shape and its first reduced thickness regions RTR1t and RTR1b may be annular regions, and the radial strain accommodation channel RASC may comprise an annular groove that is formed in an exterior surface of the case end portion CEPt or CEPb. In particular, the annular groove that forms the radial strain accommodation channel RASC is located in the case end rim portion CERt or CERb, and is configured to form an inner wall of the adjacent radial compliance bending element RCBE, which has a generally annular shape or configuration (e.g., as shown in FIGS. 6A and 6B) and has an outer peripheral surface that is the mounting surface MSt or MSb.

It will be appreciated that, according to one type of explanation or description analogous to that outlined above in relation to FIG. 4, the annular groove that forms the radial strain accommodation channel RASC in FIG. 5 allows minute strain (e.g., radial deflections or "rolling") of the adjacent radial compliance bending element RCBE to be at least partially accommodated or isolated, such that the strain that would otherwise be transmitted to stress or distort the relatively compliant enhanced radial compliance portion ACP, or other structures of the case end portion CEP that are radially interior to the radial strain accommodation channel RSAC, is significantly reduced. This results in more stable operation of the TAG lens 170E and is synergistic with the use of enhanced axial compliance portions ACP as disclosed herein.

FIGS. 6A and 6B are diagrams of isometric and top views of a TAG lens 170F that is substantially similar or identical to the TAG lens 170E shown in FIG. 5, including a generic implementation of an external reservoir configuration 280, which may be understood based on disclosure included in the previously incorporated '319 application. Therefore, FIGS. 6A and 6B may be understood without further description as clarifying diagrams including different views of various similarly numbered elements and features described with reference to previous figures herein.

Although the enhanced axial compliance portions ACP outlined above have achieved enhanced axial compliance by "reduced thickness" configurations that have altered and reduced their "geometric section" properties to reduce the axial-direction stiffness of the enhanced axial compliance portions ACP, it should be appreciated that a similar result may be achieved by reducing the elastic modulus of an enhanced axial compliance portion ACP without necessarily reducing its thickness along the axial direction. For example, it is known that a part such as a case end portion CEP may be fabricated from 3D-printed and sintered metal powders, to provide desired amount of porosity in a desired region, for example as disclosed in US patent applications 2006/

0211802 A1 and/or 2010/0137990 A1, or the like, each of which is hereby incorporated herein in their entirety by reference. It is known that the elastic modulus of a metal material may be very roughly proportional to its density, when the density is achieved by a fabrication technique that provides a practical and desired percent of porosity according to known methods. Thus, using such fabrication techniques, in one implementation according to principles disclosed herein, in each case end portion at least its respective enhanced axial compliance portion comprises a material region of a metal composition that includes a porosity that reduces its average density to at most 75% of its non-porous density, and that extends around its associated window mounting portion over a subtended angle of at least 270 degrees around the optical axis. For purposes of description, it will be understood that such an enhanced axial compliance region may have a shape or projection along the axial direction that approximately corresponds to the shape of the various recessed surfaces disclosed herein, but it need not include a recessed surface, because its compliance is enhanced through its reduced material modulus instead of its cross section. It will be understood that its porosity or density may be relatively uniform in some implementations, or it may be graduated along the axial or radial directions in other implementations, if desired. Use of a reduced density porous material need not be limited to the enhanced axial compliance portions ACP—it may be used in some of all of a case end portion CEP, if desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations.

These and other changes can be made to the implementations in light of the above-detailed description. In general, in the following claims, the terms used should not be construed to limit the claims to the specific implementations disclosed in the specification. Rather, they should be construed to include all possible implementations based on the principles and teachings disclosed herein along with the full scope of equivalents to which such claims are entitled.

The invention claimed is:

1. A tunable acoustic gradient (TAG) lens comprising:
a controllable acoustic wave generating element;
a refractive fluid;
a lens casing surrounding a casing cavity, wherein:
an operational volume of the refractive fluid is contained in the casing cavity and the controllable acoustic wave generating element is arranged inside the lens casing around an optical path that passes through the operational volume, an axial direction of the TAG lens defined as parallel to an optical axis of the optical path; and
the operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element; and
the lens casing comprises:
a case wall portion that extends generally along the axial direction, and
first and second case end portions that extend generally transverse to the axial direction, wherein each case end portion comprises a centrally located window configuration comprising a window mounted along the optical path in a window mounting portion and a case end rim portion that is at least partially aligned with and sealed to the case wall portion,
wherein:
each window mounting portion has an overall window mount axial dimension defined between two parallel window mount boundary planes that are perpendicular to the optical axis and that respectively coincide with the furthest interior and exterior surfaces of the that window mounting portion; and
each case end portion further comprises a respective enhanced axial compliance portion that is coupled between and sealed to its associated window mounting portion and case end rim portion and holds its associated window mounting portion in place and is configured to enhance an axial deflection amplitude of its associated window mounting portion relative to its associated case end rim portion when the periodic drive signal is applied to the acoustic wave generating element, wherein:
in each case end portion its respective enhanced axial compliance portion comprises a first reduced thickness region that is characterized by a reduced material thickness along the axial direction that is at most 75% of the overall window mount axial dimension of its associated window mounting portion, and that extends around its associated window mounting portion over a subtended angle of at least 270 degrees around the optical axis.

2. The TAG lens of claim 1, wherein in each case end portion the first reduced thickness region is characterized by a reduced material thickness along the axial direction that is at most 65% of the overall window mount axial dimension of its associated window mounting portion.

3. The TAG lens of claim 1, wherein in each case end portion the first reduced thickness region is characterized by a reduced material thickness along the axial direction that is at most 55% of the overall window mount axial dimension of its associated window mounting portion.

4. The TAG lens of claim 1, wherein in each case end portion the first reduced thickness region comprises a first recessed surface that is coextensive with or larger than the first reduced thickness region and that is recessed along the axial direction relative to an adjacent surface of its associated case end portion and that bounds the reduced material thickness of the first reduced thickness region along the axial direction.

5. The TAG lens of claim 4, wherein at least one of the case end portions comprises a window mounting portion, case end rim portion and enhanced axial compliance portion that are all formed in a single continuous piece of material, wherein the first recessed surface comprises a surface portion of a groove formed in the single continuous piece of material.

6. The TAG lens of claim 5, wherein the TAG lens has a generally cylindrical shape and the groove formed in the single continuous piece of material is an annular groove.

7. The TAG lens of claim 4, wherein the first recessed surface of at least one case end portion is located in an interior surface of that case end portion.

8. The TAG lens of claim 7, wherein the enhanced axial compliance portion of at least one case end portion that includes the first recessed surface located in its interior surface further includes a second recessed surface located in an exterior surface of that case end portion, wherein the second recessed surface is recessed along the axial direction relative to an adjacent surface of its associated case end portion and extends around its associated window mounting portion over a subtended angle of at least 270 degrees around the optical axis.

9. The TAG lens of claim 8, wherein the second recessed surface is configured to align with at least part of the first recessed surface along the axial direction and the second recessed surface bounds the reduced material thickness of at least part of the first reduced thickness region along the axial direction.

10. The TAG lens of claim 8, wherein the second recessed surface is configured to not align with any part of the first recessed surface along the axial direction, and a separation distance along the axial direction between first and second planes that respectively coincide with the furthest recessed portions of the first and second recessed surfaces, is at most 55% of the overall window mount axial dimension of their associated window mounting portion.

11. The TAG lens of claim 8, wherein the first and second recessed surfaces comprise annular recessed surfaces that each extend over a subtended angle of 360 degrees around the optical axis.

12. The TAG lens of claim 1, wherein in each case end portion its associated case end rim portion comprises portions defining an abutment surface plane that is nominally perpendicular to the optical axis, and all exterior surfaces of its associated window mounting portion are recessed along the axial direction relative to the abutment surface plane by a distance along the axial direction that is greater than the enhanced axial deflection amplitude of that associated window mounting portion.

13. The TAG lens of claim 1, wherein;
in at least one case end portion its associated case end rim portion includes a mounting surface around its periphery that is configured to receive a mounting element that exerts force on the mounting surface along a radial direction that is perpendicular to optical axis; and
that at least one case end portion further comprises a radial strain isolation configuration comprising at least one of a radial strain accommodation channel or a radial compliance bending element that extends over a subtended angle of at least 270 degrees around the optical axis and that is located between its mounting surface and the first reduced thickness region of its associated enhanced axial compliance portion along the radial direction.

14. The TAG lens of claim 13, wherein:
the TAG lens has a generally cylindrical shape;
the first reduced thickness region is an annular region; and
the radial strain accommodation channel comprises an annular groove that is formed in an exterior surface of that at least one case end portion.

15. The TAG lens of claim 14, wherein the annular groove that forms the radial strain accommodation channel is located between the case end rim portion and the first reduced thickness region.

16. The TAG lens of claim 14, wherein the annular groove that forms the radial strain accommodation channel is located in the case end rim portion and is configured to form an inner wall of an adjacent radial compliance bending element that has an annular shape and that has an outer peripheral surface that is the mounting surface.

17. The TAG lens of claim 1, wherein at least the enhanced axial compliance portion and the window configuration of each case end portion are configured to provide a resonant mode of the TAG lens comprising axial translation of the window mounting portion relative to its associated case end rim portion, wherein the resonant bandwidth of that resonant mode, as indicated by the amplitude of the axial translation of the window mounting portion relative to its associated case end rim portion, includes the frequency of the periodic drive signal that is applied to the acoustic wave generating element.

18. A tunable acoustic gradient (TAG) lens comprising:
a controllable acoustic wave generating element;
a refractive fluid;
a lens casing surrounding a casing cavity, wherein:
an operational volume of the refractive fluid is contained in the casing cavity and the controllable acoustic wave generating element is arranged inside the lens casing around an optical path that passes through the operational volume, an axial direction of the TAG lens defined as parallel to an optical axis of the optical path; and
the operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element; and
the lens casing comprises:
a case wall portion that extends generally along the axial direction, and
first and second case end portions that extend generally transverse to the axial direction, wherein each case end portion comprises a centrally located window configuration comprising a window mounted along the optical path in a window mounting portion and a case end rim portion that is at least partially aligned with and sealed to the case wall portion,
wherein:
each case end portion further comprises a respective enhanced axial compliance portion that is coupled between and sealed to its associated window mounting portion and case end rim portion and holds its associated window mounting portion in place and is configured to enhance an axial deflection amplitude of its associated window mounting portion relative to its associated case end rim portion when the periodic drive signal is applied to the acoustic wave generating element, wherein:
in each case end portion at least its respective enhanced axial compliance portion comprises a material region of a metal composition that includes a porosity that reduces its average density to at most 75% of its non-porous density, and that extends around its associated window mounting portion over a subtended angle of at least 270 degrees around the optical axis.

* * * * *